(12) United States Patent
Fortin

(10) Patent No.: US 12,186,894 B2
(45) Date of Patent: Jan. 7, 2025

(54) ARTICULATED MECHANISM WITH PROTECTIVE SLEEVE AT JOINT

(71) Applicant: KINOVA INC., Boisbriand (CA)

(72) Inventor: Louis-Pierre Fortin, Montreal (CA)

(73) Assignee: KINOVA INC., Boisbriand (CA)

( * ) Notice: Subject to any disclaimer, the term of this patent is extended or adjusted under 35 U.S.C. 154(b) by 253 days.

(21) Appl. No.: 17/725,039

(22) Filed: Apr. 20, 2022

(65) Prior Publication Data

US 2022/0241991 A1 Aug. 4, 2022

Related U.S. Application Data

(62) Division of application No. 16/570,095, filed on Sep. 13, 2019, now Pat. No. 11,331,814.

(60) Provisional application No. 62/730,621, filed on Sep. 13, 2018.

(51) Int. Cl.
*B25J 17/00* (2006.01)
*B25J 9/10* (2006.01)
*B25J 18/00* (2006.01)

(52) U.S. Cl.
CPC ............... *B25J 17/00* (2013.01); *B25J 9/106* (2013.01); *B25J 18/00* (2013.01)

(58) Field of Classification Search
CPC ... B25J 17/00; B25J 9/106; B25J 18/00; B25J 1/10; B25J 1/02; B25J 18/06
See application file for complete search history.

(56) References Cited

U.S. PATENT DOCUMENTS

| | | | | |
|---|---|---|---|---|
| 3,266,059 A | * | 8/1966 | Stelle | B25J 9/06 138/131 |
| 4,621,965 A | * | 11/1986 | Wilcock | B25J 18/06 901/14 |
| 4,712,969 A | * | 12/1987 | Kimura | B25J 9/0075 414/730 |
| 4,848,179 A | * | 7/1989 | Ubhayakar | B25J 9/1085 901/22 |
| 4,954,952 A | * | 9/1990 | Ubhayakar | B25J 15/103 244/172.6 |
| 5,607,190 A | * | 3/1997 | Exandier | F16L 37/0985 285/308 |
| 8,118,774 B2 | * | 2/2012 | Dann | A61M 25/0119 604/95.04 |
| 9,126,332 B2 | * | 9/2015 | Caron | B25J 9/08 |
| 9,677,602 B1 | * | 6/2017 | Baghdasarian | B25J 19/0004 |

(Continued)

*Primary Examiner* — Zakaria Elahmadi
(74) *Attorney, Agent, or Firm* — NORTON ROSE FULBRIGHT CANADA LLP

(57) ABSTRACT

An assembly of links and motorized joint unit comprises two or more links. The links have a tubular body, one or both ends of the tubular body being an open end. A motorized joint unit has a first portion received in the open end of the tubular body of a first of the links so as to be secured relative to the first of the links. A second portion is rotatable relative to the first portion by actuation of the motorized joint unit, the second portion received in the open end of the tubular body of a second of the links, the motorized joint unit secured relative to the second of the links. A protective sleeve has a tubular body mounted over part of the motorized joint unit to cover a gap between the first and the second of the links, the protective sleeve having a rigid annular member and a flexible annular member, the flexible annular member foldable onto the rigid annular member.

13 Claims, 5 Drawing Sheets

(56) References Cited

U.S. PATENT DOCUMENTS

| | | | |
|---|---|---|---|
| 9,914,226 B2* | 3/2018 | Klews | F16M 11/06 |
| 9,919,434 B1* | 3/2018 | Rey | B25J 9/0075 |
| 10,099,367 B2 | 10/2018 | Hirabayashi | |
| 2003/0116211 A1* | 6/2003 | Ward | F16L 55/179 |
| | | | 138/97 |
| 2006/0075797 A1* | 4/2006 | Baulier | B21D 39/021 |
| | | | 72/220 |
| 2008/0216560 A1* | 9/2008 | Ridgway | G01M 3/28 |
| | | | 73/40.5 R |
| 2009/0289591 A1* | 11/2009 | Kassow | B25J 9/1671 |
| | | | 901/3 |
| 2011/0257786 A1* | 10/2011 | Caron L'Ecuyer | B25J 17/025 |
| | | | 901/46 |
| 2013/0340560 A1* | 12/2013 | Burridge | B25J 17/025 |
| | | | 74/490.05 |
| 2015/0068350 A1* | 3/2015 | Kirihara | B25J 19/0025 |
| | | | 901/28 |
| 2015/0133960 A1* | 5/2015 | Lohmeier | A61B 90/40 |
| | | | 606/130 |
| 2015/0321362 A1* | 11/2015 | Nakanishi | B25J 19/0075 |
| | | | 277/500 |
| 2015/0366547 A1* | 12/2015 | Galloway | A61B 17/02 |
| | | | 600/207 |
| 2016/0213434 A1* | 7/2016 | Lohmeier | A61B 17/00234 |
| 2017/0047792 A1* | 2/2017 | Klassen | H02K 5/16 |
| 2017/0072572 A1* | 3/2017 | Wagner | B25J 15/0023 |
| 2018/0058615 A1* | 3/2018 | Kurebayashi | F16L 23/003 |
| 2018/0080841 A1* | 3/2018 | Cordoba | A61B 34/35 |
| 2018/0111275 A1* | 4/2018 | Kurek | B25J 19/02 |
| 2018/0216715 A1* | 8/2018 | Okamura | B25J 9/102 |
| 2018/0351341 A1* | 12/2018 | Hutsler | H02G 15/196 |
| 2019/0054640 A1* | 2/2019 | Piette | B25J 9/104 |
| 2019/0214883 A1* | 7/2019 | Klassen | H02K 7/088 |
| 2019/0216557 A1* | 7/2019 | Ishihara | A61B 34/71 |
| 2019/0337165 A1* | 11/2019 | He | B25J 17/00 |
| 2020/0016774 A1* | 1/2020 | Keen | F16D 13/648 |
| 2020/0101628 A1* | 4/2020 | Li | B25J 17/00 |
| 2020/0214775 A1* | 7/2020 | Farritor | A61B 1/00059 |
| 2020/0324405 A1* | 10/2020 | Berwers | B25J 19/022 |
| 2021/0016432 A1* | 1/2021 | Mizukoshi | B25J 9/108 |

* cited by examiner

ARTICULATED MECHANISM WITH PROTECTIVE SLEEVE AT JOINT

CROSS-REFERENCE TO RELATED APPLICATION

The present application is a divisional of U.S. patent application Ser. No. 16/570,095, filed on Sep. 13, 2019, which claims the priority of U.S. Patent Application No. 62/730,621, filed on Sep. 13, 2018 and incorporated herein by reference.

TECHNICAL FIELD

The present application relates to the field of robotics involving mechanisms such as articulated mechanisms and robot arms and to an assembly thereof.

BACKGROUND OF THE ART

Robotic arms are increasingly used in a number of different applications, from manufacturing, to servicing, and in assistive robotics, among numerous possibilities. In some applications, the robot arms are exposed to their environments, whereby the robot arms must be configured in such a way that their components are shielded from liquids and debris. The challenge is to shield joints between robot arm links. However, such shielding must nonetheless be esthetically pleasing, as opposed to being bulky and cumbersome.

SUMMARY

It is an aim of the present disclosure to provide a mechanism such as a robot arm that addresses issues related to the prior art.

Therefore, in accordance with the present disclosure, there is provided an assembly of links and motorized joint unit, comprising: at least pair of links, each said link having a tubular body, at least one end of each of the tubular body being an open end; a motorized joint unit having a first portion received in the open end of the tubular body of a first of the links so as to be secured relative to the first of the links, a second portion rotatable relative to the first portion by actuation of the motorized joint unit, the second portion received in the open end of the tubular body of a second of the links, the motorized joint unit secured relative to the second of the links; and a protective sleeve having a tubular body mounted over part of the motorized joint unit to cover a gap between the first and the second of the links, the protective sleeve having a rigid annular member and a flexible annular member, the flexible annular member foldable onto the rigid annular member.

In accordance with another embodiment of the present disclosure, there is provided an assembly of links and motorized joint unit of a mechanism, comprising: at least pair of links, each said link having a tubular body, at least one end of each of the tubular body being an open end having or receiving at least one connector; a motorized joint unit having a first portion received in the open end of the tubular body of a first of the links, the motorized joint unit secured to the at least one connector at the first of the links, a second portion rotatable relative to the first portion by actuation of the motorized joint unit, the second portion received in the open end of the tubular body of a second of the links, the motorized joint unit secured to the at least one connector at the second of the links; and a protective sleeve having a tubular body rotatably mounted over the motorized joint unit, the protective sleeve having a rigid annular member covering the at least one connector at or of the first link, and a flexible annular member covering the at least one connector at or of the second link, the flexible annular member foldable onto the rigid annular member to expose the at least one connector at or of the second link.

In accordance with yet another embodiment of the present disclosure, there is provided a protective sleeve for covering a joint between links of a robotic arm, comprising: a rigid annular member; and a flexible annular member covering an outer surface of the rigid annular member, and having a portion extending axially beyond the rigid annular member, the flexible annular member foldable onto the rigid annular member.

In accordance with yet another embodiment of the present disclosure, there is provided a method of assembling links of a robot arm, comprising: positioning a protective sleeve over a first portion of a motorized joint unit connected to a first of the links, the protective sleeve a rigid annular member and a flexible annular member, the flexible annular member folded onto the rigid annular member; securing a second one of the links to a second portion of the motorized joint unit; and unfolding the flexible annular member to cover the second portion of motorized joint unit.

In accordance with yet another embodiment of the present disclosure, there is provided a method of installing a shell sealing ring comprising at a motorized joint: placing a seal in a groove of the first robot arm member connecting ring; fastening the first robot arm member connecting ring to one end of the gear motor; turning over the flexible material section of the shell sealing ring over the rigid material section; installing on the first robot arm member connecting ring the section of the shell sealing ring that comprises the hard material section so the rigid material section has a positive contact with the seal placed in the groove of the first robot arm member connecting ring; fastening a second robot arm member connecting ring on the other end of the gear motor; placing the turned over section of the flexible material on the second arm member connecting ring by inserting the protrusion of the flexible section of the shell sealing ring in the groove of the second arm member connecting ring.

DETAILED DESCRIPTION

Figure 1:
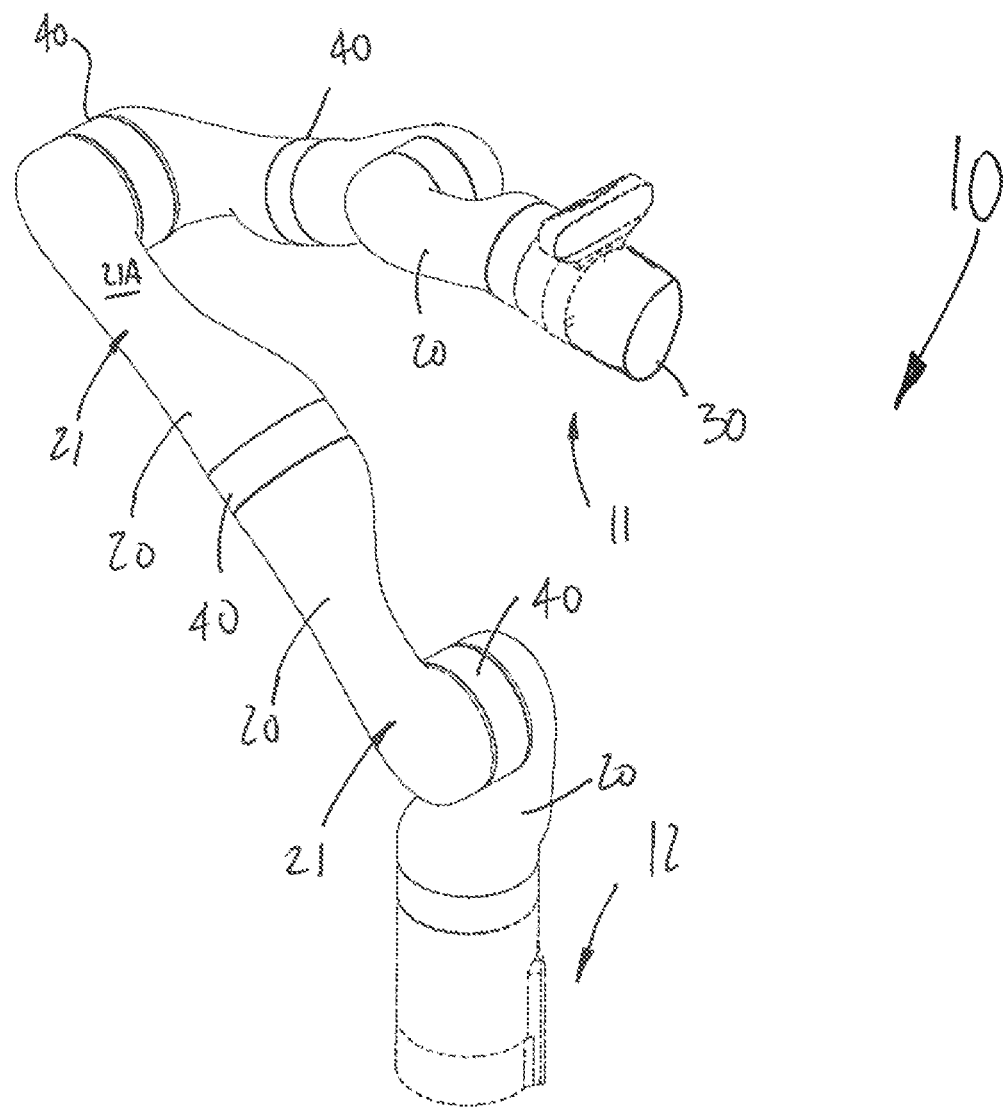
FIG. 1 is a perspective view of an articulated robot arm in accordance with an embodiment of the present disclosure.

Referring to the drawings and more particularly to FIG. 1, a mechanism such as a robot arm in accordance with the present disclosure is generally shown at 10, and is also referred to as an articulated robotic arm, a robotic arm, etc.

Although the protective sleeve and joint configuration described herein are shown on the robot arm 10, they may be used with other mechanisms, such as articulated mechanisms or arms, serial mechanisms or arms, parallel mechanisms or arms, or like mechanisms or arms. However, for simplicity, the expression "robot arm" is used throughout, but in a non-limiting manner. The robot arm 10 is a serial articulated robot arm, having an effector end 11 and a base end 12. The effector end 11 is configured to receive any appropriate tool, such as gripping mechanism or gripper, anamorphic hand, tooling heads such as drills, saws, an instrument drive mechanism, etc. The end effector secured to the effector end 11 is as a function of the contemplated use. However, the robot arm 10 is shown without any such tool in FIG. 1, a motorized joint unit being shown instead, and ready for supporting a tool. The motorized joint unit is tasked with driving the end effector, and may have other names, such as a gearmotor, a motor, an actuator, etc. The base end 12 is configured to be connected to any appropriate structure or mechanism. The base end 12 may be rotatably mounted or not to the structure or mechanism. By way of a non-exhaustive example, the base end 12 may be mounted to a wheelchair, to a vehicle, to a frame, to a cart, to a robot docking station. Although a serial robot arm is shown, the joint arrangement of the robot arm 10 may be found in other types of robots, including parallel manipulators.

The robot arm 10 has a series of links 20 (a.k.a., shells, tubes, tubular members, etc), interconnected by motorized joint units 30 (one shown in FIG. 1), with protective sleeves 40 at the junction between adjacent links 20, supported by connection rings 50:

The links 20 define the majority of the outer surface of the robot arm 10. The links 20 also have a structural function in that they form the skeleton of the robot arm 10 (i.e., an outer shell skeleton), by supporting the motorized joint units 30 and tools at the effector end 11, with loads supported by the tools, in addition to supporting the weight of the robot arm 10 itself. Wires and electronic components may be concealed into the links 20, by internal routing.

The motorized joint units 30 are between adjacent links 20, in such a way that a rotational degree of actuation is provided between adjacent links 20 by the motorized joint units 30. According to an embodiment, the motorized joint units 30 may also connect a link 20 to a tool at the effector end 11, or to a base at the base end 12, although other mechanisms may be used at the effector end 11 and at the base end 12. The motorized joint units 30 may also form part of the structure of the robot arm 10, as they interconnect adjacent links 20, and hence have a structural responsibility.

The protective sleeves 40 shield the junction between pairs of adjacent links 20, e.g., in a water, fluid and particle resistant manner. As shown in the Figures, the protective sleeves 40 may be fastener-less, in that they are not retained by fasteners. Moreover, the protective sleeves 40 may form a continuous fastener-less surface from one link 20 to another, as explained hereinafter. With the protective sleeves 40 installed, the robot arm 20 may therefore conceal all structural fasteners, i.e., fasteners tasked with interconnecting structural components of the robot arm 10.

Connection rings 50 may be present as connectors or interfaces between the motorized joint unit 30 and the links 20. The robot arm 10 may also be without the connection rings 50 as their features may be integrated to the links 20 as part of a connector integrated directly into the links 20.

Figure 5:
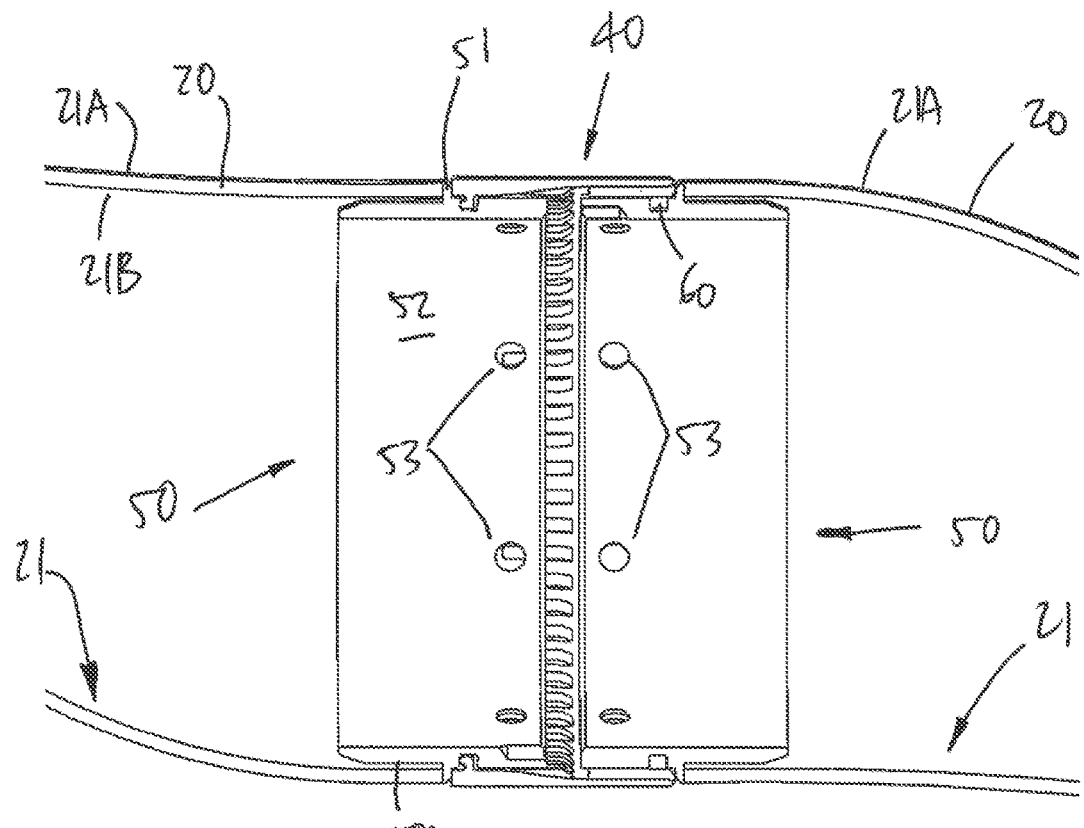
FIG. 5 is a perspective view of a joint between links of the articulated robotic arm with the protective sleeve of FIG. 2, with motorized joint unit removed for clarity.
Figure 6:
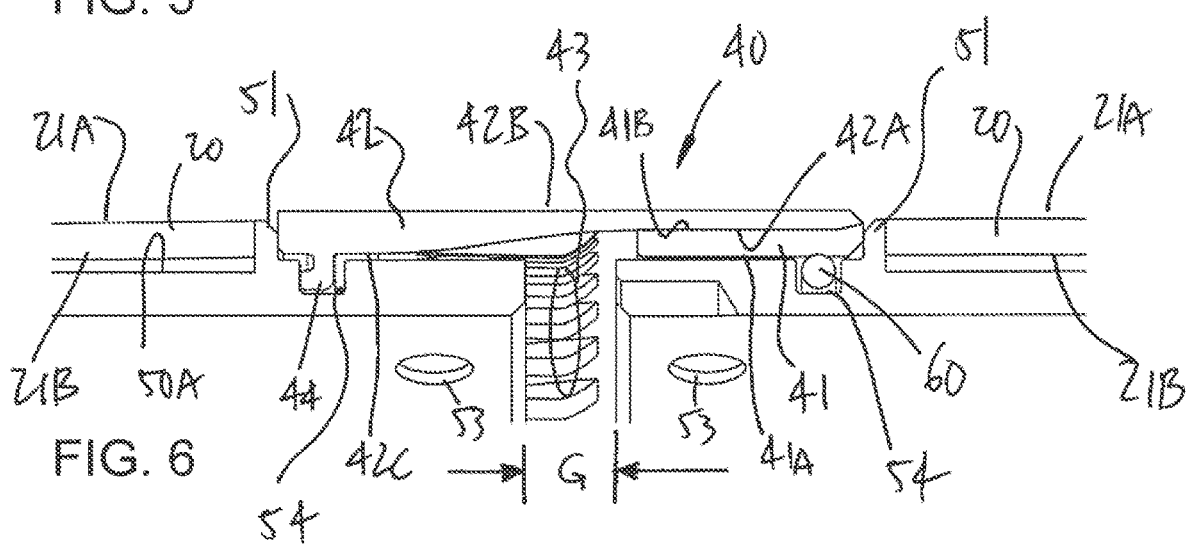
FIG. 6 is an enlarged sectional view of the assembly of FIG. 5.

Referring to FIGS. 1, 5 and 6, the links 20 are shown as each having a tubular body 21 (FIGS. 5 and 6). The expression "link" is used herein to describe a rigid member, without in and of itself any degree of freedom between its ends. A link may be connected to another link by a joint, such as one of the motorized joint units 30. An outer peripheral surface 21A of the links 20 forms the majority of the exposed surface of the robot arm 10, with inner surfaces 21B delimiting the interior of the tubular bodies. The tubular bodies 21 may differ in length, in diametrical dimension, and in shape. For example, as shown in FIG. 1, some of the tubular bodies 21 may be generally straight, or may be angled, i.e., arranged such that the rotation angles of the motorized joint units 30 at their opposed ends are parallel, perpendicular, or at any other angle. Some tubular bodies 21 may be longer, shorter, etc. Also, although the open ends of the tubular bodies 21 may have the same diameter for all motorized joint units 30 to be the same size, it is contemplated to scale down the motorized joint units 30 from the proximal base end 12 to the distal effector end 11 to reduce the overall weight of the robot arm 10. In such a case, the diameter of the open ends of the tubular body 21 may incrementally reduce toward the distal end. The tubular bodies 21 may consist of any appropriate material, including composites, plastics, metals, or any combination thereof. The tubular bodies 21 may be monolithic pieces, or an assembly of components, and may be molded, extruded, machined, etc.

The open ends of the tubular bodies 21 may each receive one side of the motorized joint unit 30. Each of the open ends of the tubular bodies 21 may also have one of the connection rings 50, with the connection rings 50 interfacing the motorized joint unit 30 to the tubular bodies 21. However, the robot arm 10 may be without such connection rings 50, with the motorized joint units 30 connected directly to the links 20 instead.

Referring to FIGS. 1 and 7A-7C, one of the motorized joint units 30 is shown in part. The motorized joint unit 30 should also be shown in FIGS. 5 and 6, but has been removed to better illustrate the interior of the connection rings 50. The motorized joint unit 30 is of the type having two casing shells 31 (one shown) or like structural components or frame members, rotatable relative to one another along rotational axis X, as a response to actuation from the motorization components inside the motorized joint unit 30. Therefore, the two casing shells 31 are separated by a rotation plane, to which a vector of the rotational axis X is normal. For simplicity, the interior of the motorized joint unit 30 is not shown in detail, as any appropriate internal motor arrangement could be used. By way of example, U.S. Pat. No. 9,126,332, describes a possible motorized joint, and is incorporated herein by reference.

Each of the casing shells 31 of the motorized joint unit 30 may have an annular connector surface 32 in which fastener bores 33 are circumferentially distributed, to match the distribution of connection bores in the connection rings 50 as described hereinafter. The annular connector surface 32 may be substantially cylindrical, or frusto conical etc. The fastener bores 33 may be of different sizes or of a same size, and may be equidistantly circumferentially distributed, or distributed with a given non-uniform spacing sequence. The fastener bores 33 emulate a sequence of connection bores in the connection rings 50, if there is such a sequence of connection bores (as opposed to having a unique connection bore format with equidistant circumferential spacing). For example, set screws may be used for greater positional accuracy, while normal screws may be concurrently used for strength, etc. Any irregular sequence as described above may be used to ensure that the motorized joint unit 30 is installed in a desired orientation in the links 20.

End flanges 34 (FIGS. 7A and 7B) may be at an end of the annular connector surfaces 32, and may assist in keeping the motorized joint units 30 axially aligned at the end of the tubular bodies 21, by forming a stop against axial displacement of the connection rings 50 (if present). This may prevent the motorized joint units 30 from being swallowed by the tubular bodies 21 during assembly, for example. The rotation plane of the motorized joint unit 30 may lie between the end flanges 34. When a pair of the links 20 is assembled end to end with a motorized joint unit 30 between them, for instance via the connection rings 50 if present, as shown in FIGS. 1 and 7A-7C, the assembly is compact and robust. In particular, the connection rings 50 may come into contact with the respective end flanges 34 of the motorized joint unit 30.

Referring to FIGS. 1-6, the protective sleeve 40 is shown as covering the joint or junction between adjacent links 20, with the connection rings 50 optionally visible if present. The protective sleeve 40 may have a smooth substantially cylindrical outer peripheral surface, having more or less the same outer diameter as that of the outer peripheral surface 21A of the tubular bodies 21. Therefore, the robot arm 10 has a generally constant diameter at the joints between adjacent links 20, with at least a portion of the tubular bodies 21 adjacent to the sleeves 40 having the same outer diameter as the protective sleeve 40. In an embodiment, a length or height of the protective sleeve 40, i.e., along a central axis of the sleeve 40, is sized for the sleeve 40 to bridge or cover the space between the adjacent links 20.

Figure 2:
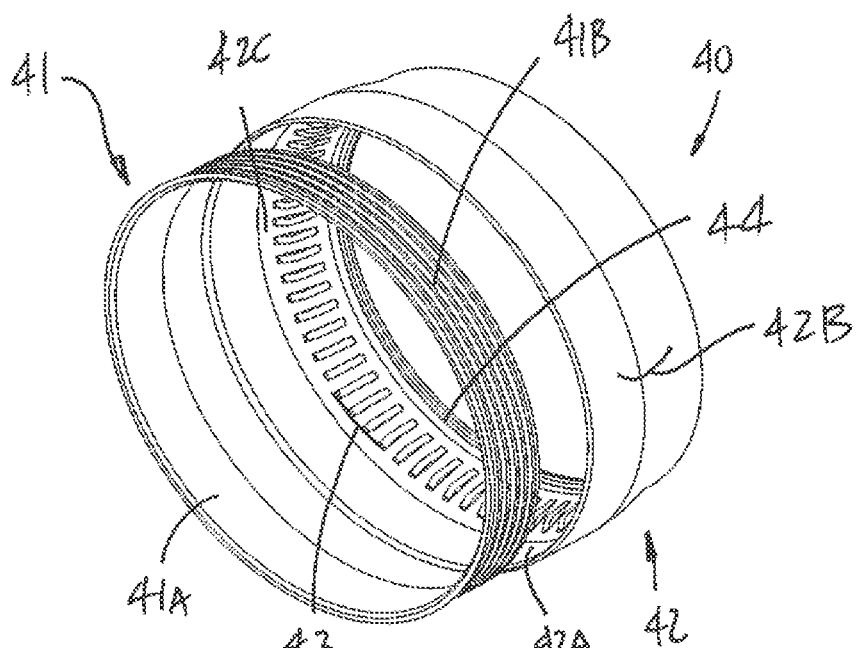
FIG. 2 is an exploded view of protective sleeve used at joints of the articulated robot arm of FIG. 1.
Figure 3:
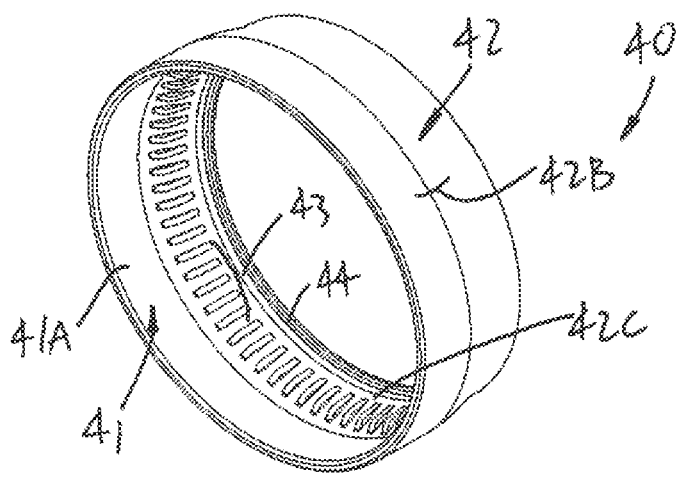
FIG. 3 is a perspective view of the protective sleeve of FIG. 2.
Figure 4:
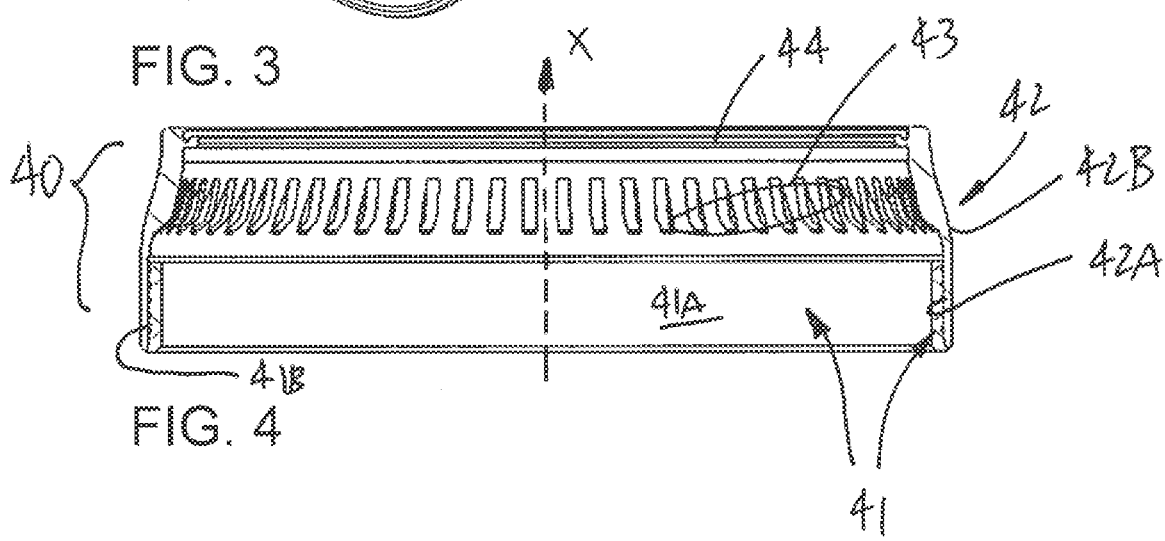
FIG. 4 is a sectional view of the protective sleeve of FIG. 2.

Referring to FIGS. 2-4, the sleeve 40 may have a rigid annular member 41 and a flexible annular member 42 mounted onto the rigid annular member 41. The flexible annular member 42 is axially longer (i.e., along the X-axis) than the rigid annular member 41 so as to extend beyond it at least in one axial direction, as shown in FIGS. 3 and 4.

The rigid annular member 41 may have a smooth cylindrical inner surface 41A. The outer surface 41B may also be smooth, or may have circumferential surface ribs or like surface disruptions as in FIG. 2, to add friction to the interconnection between the rigid annular member 41 and the flexible annular member 42. According to another embodiment, the rigid annular member 41 may be made of a polymer, a composite, a metal. The rigid annular member 41 is said to be rigid, i.e., it is substantially more plastomeric than elastomeric. The rigid annular member 41 may have limited elastic deformation capability in contrast to the flexible annular member 42. According to an embodiment, the sleeve 40 is made of a metal, such as aluminum, or polymers such as acetal, nylon. Cylindrical inner surface 41A of the rigid annular member 41 may be coated with a low-friction coating, such as PTFE, among possibilities, as it may rotatingly slide against the connection ring 50 if present, or against the annular connector surface 32 of the motorized joint unit 30 if there are no connection rings 50.

The flexible annular member 42 may have a smooth cylindrical inner surface portion 42A that will be overlaid onto the rigid annular member 41. The flexible annular member 42 needs to be connected to the rigid annular member 41 in a watertight manner, by the overlaying of the smooth cylindrical inner surface portion 42A onto the outer surface 41B. They can be bound with glue, cement or the like, or simply by the stretching of the flexible annular member 42 over the rigid annular member 41 provided a suitable watertight connection is achieved. The rigid annular member 41 and flexible annular member 42 may also be co-molded or assembled according to any other technique to have them solidly or integrally connected to each other.

The outer surface 42B of the flexible annular member 42 may also be smooth and continuous, for instance without any surface disruption, such as holes, edges, etc. In accordance with an embodiment, when the protective sleeve 40 is installed onto the robot arm 10 as in FIG. 1, the outer surface 42B of the sleeve 40 is substantially cylindrical or may have a slight local taper.

In addition to the smooth cylindrical inner surface portion 42A, the flexible annular member 42 may have another inner surface portion 42C, for instance with axial ribs 43, or like inwardly orientation protrusions. The axial ribs 43 may be circumferentially spaced apart along the inner surface portion 42C. As shown in FIG. 4, the ends of the axial ribs 43 may taper toward the surrounding cylindrical surface of the inner surface portion 42C. The inner surface portion 42C may also have an annular seal member 44 projecting radially inwardly. The smooth cylindrical inner surface portion 42A may be without the ribs 43 or similar protrusions, and/or without the annular seal member 44.

The flexible annular member 42 is said to be flexible in that it is made of an elastomeric material that has a substantially greater elastic deformation capability than that of the rigid annular member 41. For example, the flexible annular member 42 may be made of an elastomer or an elastomeric material such as silicone, PTE, urethane, rubber, etc. The material of the flexible annular member 42 may be selected as a function of the contemplated use of the robot arm 10. For example, the selection of material for the flexible annular member 42 may depend on the temperatures to which the robot arm 10 will be subjected, the fluids that may contact the robot arm 10, etc. With this high elastic deformation capability, the flexible annular member 42 may be manually folded onto itself in half, such that the portion 42C is flipped over the rigid annular member 41 in the manner shown in FIG. 7B, with no or with limited plastic deformation. According to an embodiment, the flexible annular member 42 is monolithically molded and consequently includes the axial ribs 43 and the annular seal member 44, if present. The presence of the ribs 43 may facilitate the action of flipping/folding of the flexible annular member 42 over itself during the installation as described below with reference to FIGS. 7A-7C. The ribs 43 may also reduce stress concentration on the flexible annular member 42 in the folded condition.

At least one of the inner surface portions 42A and 42C may consist of or may be coated with a low-friction coating, such as PTFE, among possibilities, as it may rotatingly slide against the connection ring 50 if present, or against the annular connector surface 32 of the motorized joint unit 30 if there are no connection rings 50.

Referring to FIGS. 5, 6 and 7A-7C, the connection rings 50 are shown in greater detail. The connection rings 50 may be annular in shape, with a circular section. Each open end of a link 20 may receive a connection ring 50, such that adjacent links 20 as in FIGS. 5 and 6 have a pair of connection rings 50 facing each other. According to an embodiment, the connection rings 50 of a pair are the same, or are mirror images of one another. As observed in FIG. 6, a gap G may be defined between end edges of adjacent connection rings 50, for the end flanges 34 (FIG. 7A) of the motorized joint unit 30 to be lodged therein.

The connection rings 50 may each have a flange 51 on their outer peripheral surface 50A (FIGS. 5 and 6), though the flange 51 is optional. The flange 51 consequently defines a step from the main outer peripheral surface of the connection ring 50, due to a larger diameter of the flange 51. When the connection ring 50 is inserted into an open end of the link 20 as in FIGS. 5 and 6, the flange 51 may act as stopper preventing further insertion of the connection ring 50 into the link 20. The connection ring 50 may be glued, fastened, force fitted into a fixed position and orientation into the link 20. Any appropriate connection configuration is considered, including ones without apparent fasteners, or with apparent fasteners. The flange 51 may be visible from an exterior of the robot arm 10. It is however contemplated not to provide any such flange 51, with the sleeve 40 extending all the way to the links 20 instead.

Each of the connection rings 50 may have an inner cylindrical surface 52 that will snuggly receive therein one of the casing shells 31 of the motorized joint units 30. The inner cylindrical surface 52 is sized for the annular connector surface 32 to be in close fit with it. Connection bores 53 are circumferentially distributed in the connection rings 50 in a pattern and size matching the distribution of the fastener bores 33 in the motorized joint unit 30. The connection bores 53 may include a countersink or counterbore for fasteners (not shown) to fasten the shell 31 of motorized joint unit 30 to the connection ring 50.

An annular channel 54 may be defined in the outer peripheral surface 50A of the connection ring 50, adjacent to the flange 51. The annular channel 54 may receive the annular seal member 44 of the protective sleeve 40 as in FIGS. 5 and 6, or an additional annular seal 60 also as in FIGS. 5 and 6. The annular seal 60 may be any appropriate type of seal, such as O-ring, X-shaped ring, square-section ring, to seal an annular junction between the rigid annular member 41 of the sleeve 40 and the connection ring 50, by being sized to come into contact with the rigid annular member 41. The annular seal 60 is made of an elastomer selected as a function of the contemplated use of the robot arm 10. For example, the selection of the annular seal 60 may depend on the temperatures to which the robot arm 10 will be subjected, the fluids that may contact the robot arm 10, etc. In an embodiment, the material of the annular seal 60 is selected for its low friction properties. For example, the annular seal 60 may consist of PTFE (polytetrafluoroethylene). According to an embodiment, the protective sleeve 40 does not have any annular seal member 44, with a second annular seal 60 used instead. It is also contemplated to rely on the contact between the flexible annular member 42 of the protective sleeve 40 (or even the rigid annular member 41) with the outer peripheral surface 50A of the connection ring 50 to seal the junction therebetween.

Figure 7A:
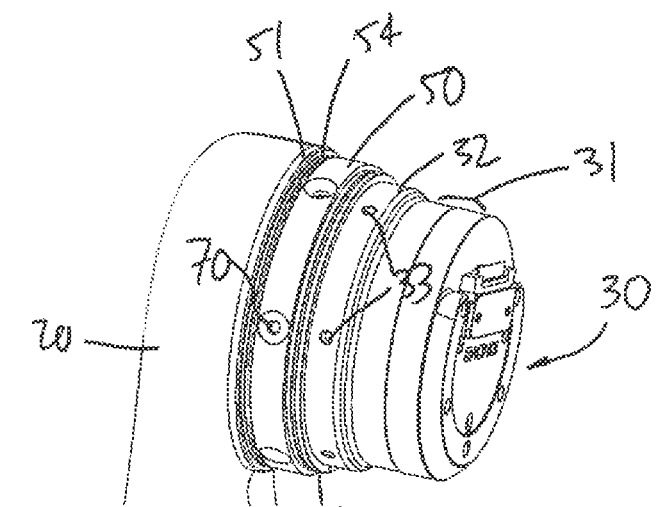
FIGS. 7A-7D show a sequence of installation of the protective sleeve of FIG. 2 to cover a joint of the articulated robotic arm.
Figure 7B:
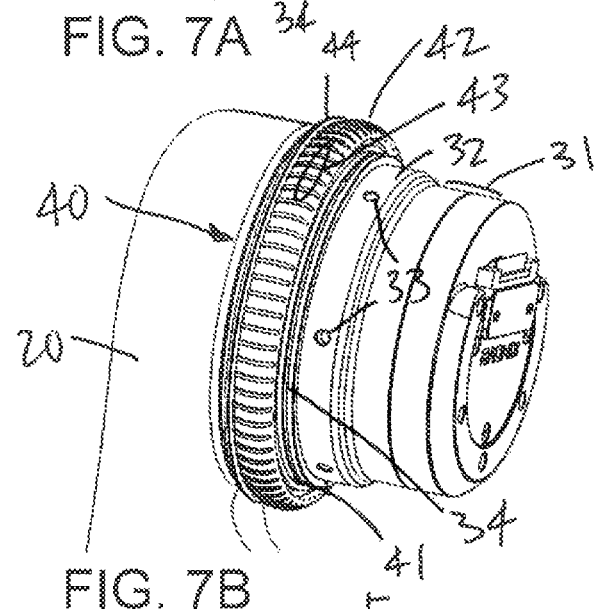
Figure 7C:
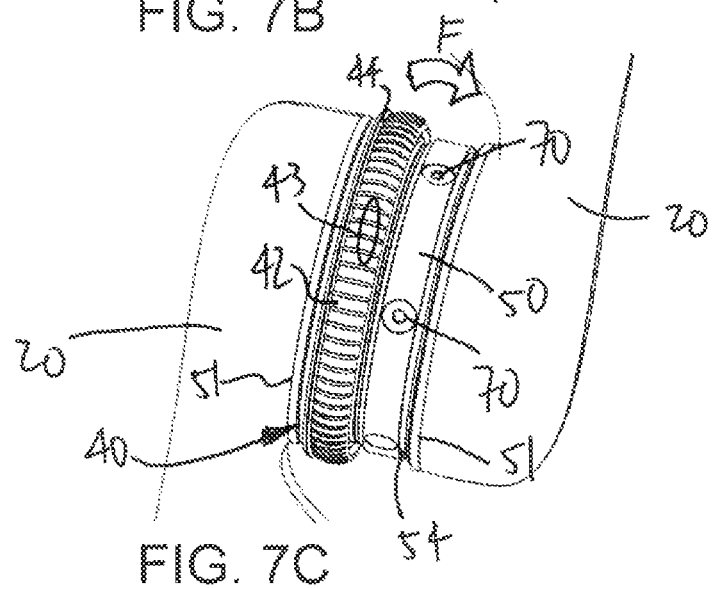

Now that structural components of the robot arm 10 have been described, a method for assembling or dissembling links 20 is set forth, with reference to FIGS. 7A-7C.

As mentioned above, the robot arm 10 may be with or without the connection ring 50. The following sequence explains the installation with the connection rings 50, with additional description then explaining an installation without connection rings 50. In FIGS. 7A-7C, the connection rings 50 are present, with one of the connection rings 50 already immovably fixed to an open end of a link 20 so as to project out of it, with abutment between the flange 51 of the connection ring 50 and the edge of the link 20. The fixing of the connection ring 50 to the link 20 may involve cement, fasteners, comolding, press fitting, etc.

One of the motorized joint units 30 has a half, i.e., one of the casing shells 31, received in a free open end of the tubular body 21 of the link 20—defined also by the connection ring 50—, until abutment between the edge of the connection ring 50 and the end flange 34. Connection of wiring of the half of the motorized joint unit 30 received in the tubular body 21 may have been done prior to the positioning of the motorized joint unit 30 as cables, if present, may be internally routed in the links 20.

Once the motorized joint unit 30 has one of its casing shells 31 in the tubular body 21 via the connection ring 50 if present, appropriate fasteners 70 secure the motorized joint unit 30 to the connection ring 50, and thus to the link 20. It may be required that the motorized joint unit 30 be rotated on itself when received in the tubular body 21, such that corresponding connection bores 53 and fasteners bores 33 are radially aligned, prior to the securing with the appropriate fasteners 70, to ensure the correct orientational alignment between the casing shell 31 and the link 20, before tightening the assembly with the fasteners. The rotation on itself may not be required if a key/keyseat is present.

Referring to FIG. 7B, the protective sleeve 40 may then be slid onto the assembly of the link 20 and motorized joint unit 30. The protective sleeve 40 has the rigid annular member 41 over the annular connector surface 32 of the motorized joint unit 30 and is in sealing engagement with the annular seal 60. Consequently, the protective sleeve 40 may rotate relative to the annular connector surface 32 on which is rests, i.e., a rotational joint is formed. Prior to doing so, or after the sliding onto the link 20, the flexible annular member 42 is folded onto itself, for the annular connector surface 32 of the other casing shell 31 to be exposed. The folding on itself may entail elastically deforming the flexible annular member 42.

In FIG. 7C, the other link 20, with its connection ring 50 already immovably fixed to it so as to project out of it (in the manner described above), is slid onto the exposed casing shell 31, until abutment between the edge of the connection ring 50 and the end flange 34. In doing so, the inner cylindrical surface 52 snuggly receives therein the casing shells 31 of the motorized joint units 30, as the inner cylindrical surface 52 is sized for the annular connector surface 32 to be in close fit with it. Connection of wiring of this other half of the motorized joint unit 30 to wires in the other link 20 may have been done prior to the sliding onto the of the motorized joint unit 30 as cables, if present, may be internally routed in the other link 20.

Appropriate fasteners 70 may then secure the motorized joint unit 30 to the connection ring 50, and thus to the link 20. It may be required to rotate the link 20 relative to the motorized joint unit 30, such that corresponding connection bores 53 and fasteners bores 33 are radially aligned, prior to the securing with the appropriate fasteners 70, to ensure the correct orientational alignment between the casing shell 31 and the link 20, before tightening the assembly with the fasteners. The rotation on itself may not be required if a key/keyseat is present.

Figure 7D:
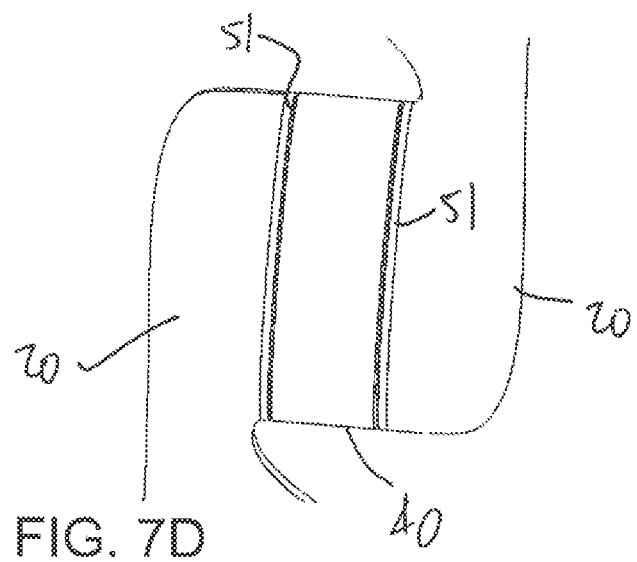

The flexible annular member 42 may then be unfolded onto the exposed surface of the connection ring 50, according to direction F in FIG. 7C. In doing so, the flexible annular member 42 conceals the connection ring 50, with the exception of the flange 51 if present, as shown in FIG. 7D. The unfolding may entail elastically deforming the flexible annular member 42 and/or returning the flexible annular member 42 to an original (or native) state, i.e., the state it was in at the exit of its molding. If the flexible annular member 42 has the annular seal member 44, the latter may penetrate into the annular channel 54 to add a sealing barrier between the protective sleeve 40 and the connection ring 50. The folding in direction F may lead to the configuration of FIGS. 5 and 6 (though with the motorized joint unit 30 present). The joints between links 20 are therefore covered by the sleeves 40 in the manner shown in FIGS. 1 and 7D.

During use, the casing shells 31 rotate relative to one another. The rigid annular member 41 may rotate relative to the casing shell 31 as it forms a rotational joint with it, while the inner surface portion 42C of the flexible annular member 42 may generally remain stationary relative to the casing shell 31 it covers.

In order to dissemble one of the links 20 from another, the protective sleeve 40 is folded onto itself to expose one of connection rings 50 and the fasteners 70, as in FIG. 7C. The fasteners 70 are then removed one by one. When the fasteners 70 are removed, the link 20 and connection ring 50 may be pulled out of engagement with the motorized joint unit 30. The protective sleeve 40 may then also be pulled out to expose the connection ring 50 on the other link 20.

As mentioned above, the robot arm 10 may be without connection rings 50, with connectors present directly in the links 20. For example, such connectors of the links 20 may include a connection ring end with connection bores equivalent to the connection bores 53. In such a case, the method of installation and disassembly described above is similar but for the motorized joint unit 30 assembled directly to the connectors of the link 20, and with the protective sleeve 40 slid onto the link 20 and folded onto the other link 20.

The protective sleeve 40 overlaps the rotational plane between links 20, and covers all structural fasteners 70. Accordingly, an exterior of the robot arm 10 may show no fasteners at the joints covered with the protective sleeves 40.

The robot arm 10 may be assembled according to a method of assembling links of a robot arm. The method could include positioning a protective sleeve over a first portion of a motorized joint unit connected to a first of the links, the protective sleeve a rigid annular member and a flexible annular member, the flexible annular member folded onto the rigid annular member; securing a second one of the links to a second portion of the motorized joint unit; and unfolding the flexible annular member to cover the second portion of motorized joint unit, as exemplified in the figures.

While the various components of the robot arm 10 are described concurrently as being part of a common robot arm, it is contemplated to use some of the components without others. In an embodiment, the connection rings 50 are threaded so as to be screwed to the open ends of the links 20, with the protective sleeve 40 covering the joint between the links 20 and the motorized joint unit 30.

The invention claimed is:

1. A protective sleeve for covering a joint between links of a robotic arm, comprising:
    a rigid annular member extending around an axis and extending longitudinally relative to the axis, the rigid annular member having an outer face; and
    a flexible annular member extending around the axis and abutting the outer surface of the rigid annular member, the flexible annular member and the rigid annular member axially overlapping each other relative to the axis, the flexible annular member having a portion extending axially beyond the rigid annular member, the flexible annular member foldable onto a folded configuration in which the portion of the flexible annular member is folded onto the rigid annular member by being flipped onto itself and in which the portion axially overlaps the rigid annular member.

2. The protective sleeve according to claim 1, wherein the flexible annular member has axially oriented ribs on an inner surface thereof.

3. The protective sleeve according to claim 2, wherein ends of the axially oriented ribs taper to the inner surface thereof.

4. The protective sleeve according to claim 2, wherein the axially oriented ribs are integrally formed in the flexible annular member.

5. The protective sleeve according to claim 1, wherein the flexible annular member is made of an elastomer, and the rigid annular member is made of one of a plastomeric polymer, a composite, and a metal.

6. The protective sleeve according to claim 1, wherein an annular seal is integrally formed into the flexible annular member and projects radially inward from an inner surface of the flexible annular member.

7. A method of assembling links of a robot arm, comprising:
    positioning a protective sleeve over a first portion of a motorized joint unit connected to a first of the links, the protective sleeve having a rigid annular member and a flexible annular member axially overlapping each other, the flexible annular member abutting an outer face of the rigid annular member, the flexible annular member flipped onto itself and folded onto the rigid annular member;
    securing a second one of the links to a second portion of the motorized joint unit; and
    unfolding the flexible annular member to cover the second portion of motorized joint unit.

8. The protective sleeve according to claim 1, wherein the outer surface of the rigid annular member is cylindrical.

9. The protective sleeve according to claim 1, wherein the rigid annular member has an inner cylindrical surface defining a rotational joint portion.

10. The protective sleeve according to claim 9, wherein the inner cylindrical surface has a low-friction coating.

11. The protective sleeve according to claim 1, wherein a watertight connection is formed where the flexible annular member covers the outer surface of the rigid annular member.

12. The protective sleeve according to claim 1, wherein the rigid annular member and the flexible annular member are integrally connected to one another.

13. The protective sleeve according to claim 1, wherein an outer surface of the flexible annular member is continuous and without any surface disruption from end to end.

* * * * *